US007156290B2

(12) United States Patent
Stemmle et al.

(10) Patent No.: US 7,156,290 B2
(45) Date of Patent: Jan. 2, 2007

(54) SYSTEM AND METHOD FOR DETERMINING AND REPORTING WHETHER A MAIL PIECE HAS BEEN OPENED BY A RECIPIENT

(75) Inventors: Denis J. Stemmle, Stratford, CT (US); Jacques E. Hasbani, Easton, CT (US); Judith D. Auslander, Westport, CT (US); Douglas B. Quine, Bethel, CT (US); David Wittenberg, Fairfield, CT (US); Pushpavadan S. Nagarsheth, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 232 days.

(21) Appl. No.: 10/735,933

(22) Filed: Dec. 15, 2003

(65) Prior Publication Data

US 2005/0127157 A1 Jun. 16, 2005

(51) Int. Cl.
*G06F 17/00* (2006.01)

(52) U.S. Cl. ....................... 235/375; 235/383; 235/487

(58) Field of Classification Search ................ 235/375, 235/380, 383, 384, 385, 487, 491, 492
See application file for complete search history.

(56) References Cited

U.S. PATENT DOCUMENTS 6,259,369 B1 * 7/2001 Monico ................... 340/572.8
6,557,758 B1 * 5/2003 Monico ...................... 235/380
2003/0121984 A1 * 7/2003 Pinchen et al. ............. 235/487

FOREIGN PATENT DOCUMENTS

WO WO 2004072875 * 8/2004

* cited by examiner

*Primary Examiner*—Karl D. Frech
(74) *Attorney, Agent, or Firm*—Martin F. Noonan; George M. Macdonald; Angelo N. Chaclas

(57) ABSTRACT

A system for determining whether a mail piece has been opened including mail pieces that have the ability indicate a previously opened and never opened state, such as with a state change element, an interrogator unit, such as an RFID reader, for receiving state information, and a data center that receives the state information from the interrogator unit. Also, a method for determining whether a mail piece has been opened including receiving mail pieces at a recipient location, receiving at an interrogator unit, such as an RFID reader, state information from the mail pieces, and transmitting the state information from the interrogator unit to a data center. In either the system or method, each mail piece may have an RFID tag that communicates with the state change element and transmits the state information to the RFID reader. Bar code or other technologies may be substituted for RFID technology.

55 Claims, 2 Drawing Sheets

SYSTEM AND METHOD FOR DETERMINING AND REPORTING WHETHER A MAIL PIECE HAS BEEN OPENED BY A RECIPIENT

FIELD OF THE INVENTION

The invention disclosed herein relates to mail processing systems, and more particularly to a system and method for determining and reporting whether, and preferably when, a mail piece has been opened by a recipient.

BACKGROUND OF THE INVENTION

The ability to determine whether a recipient of a mail piece actually opened the mail piece would be useful in many contexts. For instance, marketing mailers, i.e., entities that send large volumes of mail for purposes of marketing products and/or services, would likely find it very useful to know for a group of recipients that were sent a particular mail piece, how many those recipients simply discarded the mail piece unopened and how many of those recipients actually opened the mail piece and considered the contents thereof. The openability of a mail piece, i.e., the likelihood that it will actually be opened, is very important to such mailers and is a key factor in determining how mail pieces used for marketing purposes are designed. Currently, the effectiveness of a particular mail piece design in terms of its openability is measured only by the response rate to the mail piece. Response rate is not a very good gauge of openability as many recipients may have actually opened the mail piece, considered the contents, and simply chosen not to respond. Thus, the ability to capture more accurate information relating to openability can be used to more accurately evaluate the effectiveness of a mail piece that was used in a mailing or to test market a variety of mail piece designs prior to a mailing (and prior to investing the sums required for the mailing) to determine which have the highest openability. In addition, information relating to which particular recipients actually opened a mail piece of a certain design can also be useful to mailers such as marketing mailers to assist them in updating and refining their mailing lists to better target mail pieces to those recipients who are likely to have an interest in the mail piece. Recipients that routinely discard mail pieces unopened can be removed from the list, thereby saving the mailer on the cost of mail piece preparation and postage.

In addition, for some types of mail it would be useful for the mailer to know that the recipient opened the mail piece for legal reasons. For example, if a remittance was not received on time and the payer claims to have not received a notice of payment due and therefore protests late charges and the like, it would be beneficial for the mailer/payee to be able to have confirmed information that the recipient not only received the notice of payment due, but actually opened the mail piece and reviewed the contents. In addition, there is also value in the mailer having evidence that a specific mail piece was received by the intended receiver, even if the mail piece is never opened.

Radio frequency identification, or RFID, is a general term used to describe technologies that use radio waves to automatically identify individual objects. Typically, a serial number or the like that uniquely identifies an object (and possibly other information relating to the object) is stored on a microchip that is attached to an antenna. The microchip and antenna together are commonly referred to as RFID transponders or RFID tags. The antenna enables the microchip to transmit the stored information to an RFID reader. An RFID reader is a device that includes an antenna, a processor, a memory component and a power source, and is used to collect and compile information from RFID tags. An RFID reader converts radio waves it receives from one or more RFID tags into a form that can be stored in memory, and then be communicated to one or more computers for subsequent use thereby.

There are generally two types of RFID tags, active tags and passive tags. Active RFID tags have a battery, which provides the power required to run the microchip's circuitry and to broadcast a signal to an RFID reader. Passive RFID tags do not have a battery. Instead, they draw power from the RFID reader, which periodically transmits electromagnetic waves that induce a current in the passive RFID tag's antenna. The RFID tag's microchip modulates the waves and transmits or reflects a signal back to the RFID reader which in turn converts the signal into useful digital data. Active and passive RFID tags can be read as long as they are within the range of an RFID reader. RFID tags and RFID readers are commercially available from several well known sources such as Tagsys located in Fort Washington, Pa. and ActiveWave, Inc. located in Boca Raton Fla.

SUMMARY OF THE INVENTION

The present invention relates to a system for determining whether a mail piece has been opened including one or more mail pieces each having the ability to indicate a previously opened and a never-opened state of the mail piece, an interrogator unit for receiving first information relating to each of the mail pieces, wherein the first information includes the state information, and a remote data center in communication with the interrogator unit that receives the first information from the interrogator unit. Each mail piece may include a state change element for indicating the state thereof. In one embodiment, the interrogator unit is an RFID reader and each of the mail pieces have an RFID tag attached thereto in electrical communication with the state change element. The RFID tag transmits the first information to the RFID reader. The state change element may be a photodetector, in which case each of the mail pieces further includes an opaque piece for covering the photodetector when the mail piece is in the closed state. The opaque piece is removed from the photodetector when the mail piece is in the opened state. The RFID tag may also have second information stored therein that includes a unique code, information relating to a mailer of the mail piece and information relating to an intended recipient of the mail piece, in which case the first information includes this second information. The second information for each of the mail pieces may further include information relating to a date or time the mail piece was mailed. The RFID reader periodically transmits one or more interrogation signals and receives the first information in response to the one or more interrogation signals from those mail pieces located within the range of the RFID reader.

In an alternate embodiment, the mail receiver may activate a feature of the RFID reader to generate a removal request for each of one or more of the mail pieces that requests that the recipient be removed from a mailing list associated with the mail piece. The removal requests are transmitted to the data center and subsequently sent to the proper mailers.

The present invention also relates to a method for determining whether a mail piece has been opened including receiving one or more mail pieces at a recipient location, receiving at an interrogator unit at the recipient location first information from each of one or more of the mail pieces, wherein the first information includes the previously opened or never-opened state of the mail piece, and transmitting the first information from the interrogator unit to a remote data center. Preferably each of the mail pieces includes the ability to indicate an opened and closed state of the mail piece, such as with a state change element. In one embodiment, the interrogator unit is an RFID reader and each of the mail pieces have an RFID tag attached thereto in electrical communication with a state change element. In this embodiment, the RFID tags are used to transmit the first information for each of the mail pieces to the RFID reader. As will be appreciated, the method of the present invention may be practiced in connection with and using various combinations of the system components described above.

The information that may be collected for each mail piece using the system or method of the present invention includes the unique code for the mail piece, the information relating to the mailer and/or intended recipient, the date and/or time it was mailed, the date and/or time it enters the recipient location, whether and when it was opened, the interval between mailing and opening, the interval between entering the recipient location and opening, whether or when it was discarded, whether it was opened before being discarded, and how long it remained at the recipient location prior to being discarded. Alternately, rather than being stored in the RFID tag, the information related to the mailer and/or intended recipient and the date and/or time a mail piece was mailed could be stored in a database at the mailer's location, or anywhere else, and linked to the unique code on the mail piece. In addition, the data center may collect such information from numerous interrogator units located at numerous recipient locations and then aggregate, manipulate, analyze and/or report (in various forms) the information to various parties such as the mailers that mailed one or more of the mail pieces.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
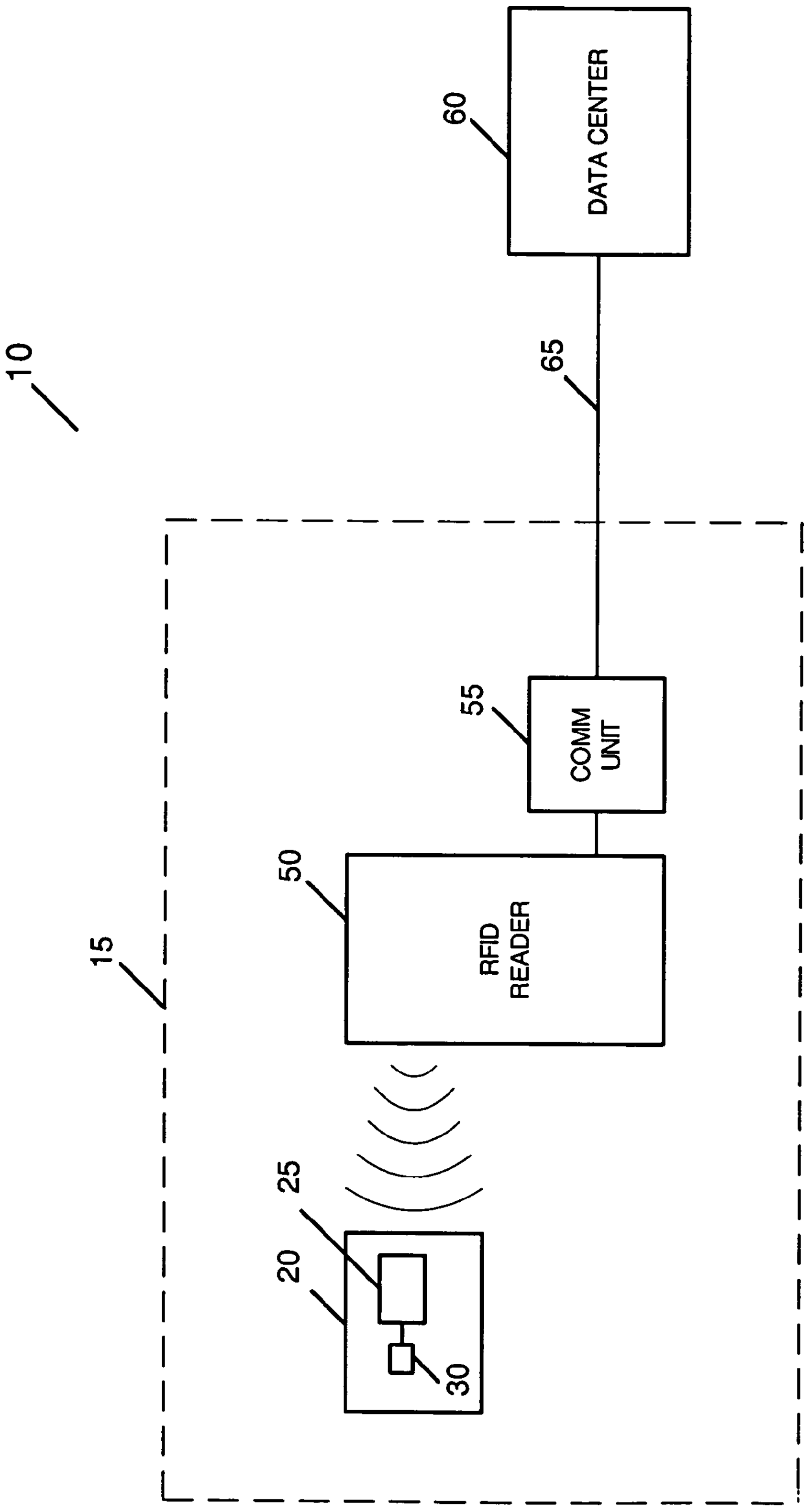
FIG. 1 is a block diagram of a system for determining whether a mail piece has been opened according to the present invention.

Referring to FIG. 1, a block diagram of a system 10 for determining and reporting whether a mail piece has been opened is shown. System 10 includes at a recipient location 15, such as a home or an office, one or more mail pieces 20 that have been mailed to the recipient by a mailer. Each mail piece 20 has attached thereto RFID tag 25, which may be an active RFID tag or, a passive RFID tag. RFID tag 25 is in electrical communication (wired or wireless) with state change element 30, which is also attached to mail piece 20. State change element 30 is a component that is able to automatically detect the fact that mail piece 20 has been opened. Specifically, state change element 30 undergoes a change of state when the mail piece 20 to which it is attached is opened, which change of state registers the fact that the mail piece 20 has been opened. One of state change element 30 or RFID tag 25 is provided with a memory cell that is used to record the change of state. In particular, the memory cell records at least the following two states: (i) mail piece 20 has not been opened, and (ii) mail piece 20 has been opened. Initially, when mail piece 20 is prepared, the memory cell is set to state (i), and when state change element 30 detects that mail piece 20 has been opened, the memory cell is set to state (ii). Thus, RFID tag 25 and state change element 30 are together able to automatically detect and record whether mail piece 20 has been opened. In one embodiment, once a change of state has been stored in the memory cell, no further changes of state will be recorded. For example, if after opening envelope 20 and considering the contents, the recipient then closes the envelope, thereby changing the state a second time, this second change of state will not be recorded or stored in the memory cell. In this embodiment, it is important only to know if the envelope has been opened by the recipient, not what happens thereafter.

Figure 2A:
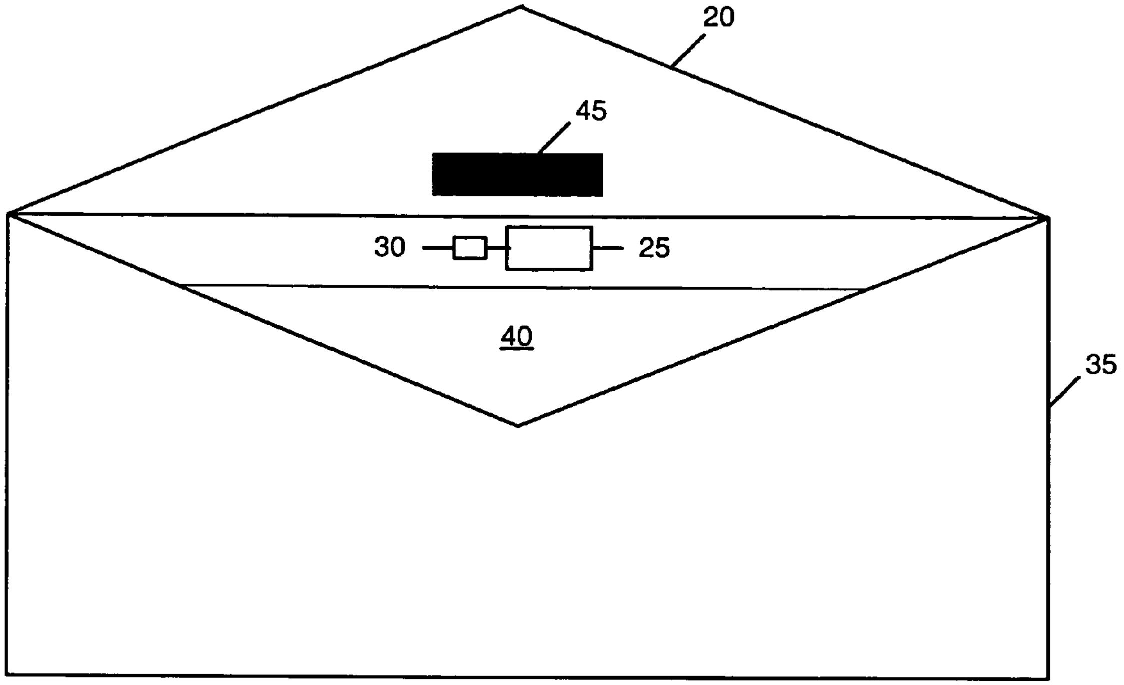
FIGS. 2A and 2B are plan views of a mail piece, opened and closed, forming a part of one embodiment of the system shown in FIG. 1.
Figure 2B:
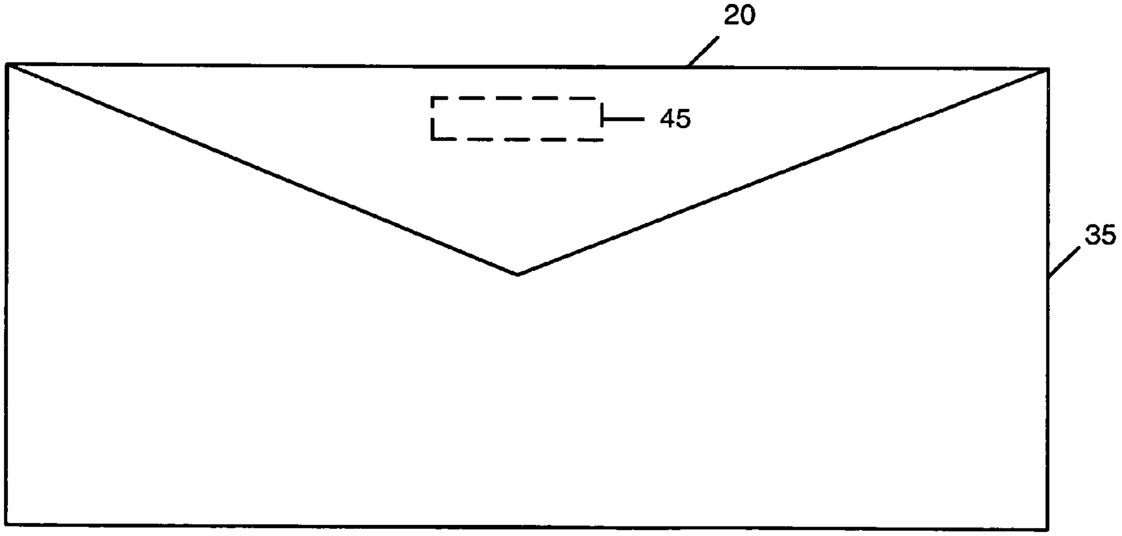

In a preferred embodiment of the present invention, shown in FIGS. 2A and 2B, state change element 30 is a photodetector or some other photo-sensitive element that is connected to or incorporated into the circuitry of RFID tag 25. RFID tag 25 and photodetector state change element 30 are embedded inside mail piece 20 either as part of the envelope 35, or, alternatively, as part of the contents 40 of mail piece 20. Mail piece 20 is also provided with an opaque piece 45 which, when mail piece 20 is closed as shown in FIG. 2B, abuts photodetector state change element 30 so as to prevent light from impinging on photodetector state change element 30. When mail piece 20 is prepared, envelope 35 is closed (wherein opaque piece 45 abuts photodetector state change element 30), and the memory cell provided in either photodetector state change element 30 or RFID tag 25 is set to the state indicating that mail piece 20 has not yet been opened. When mail piece 20 is subsequently opened, opaque piece 45 is removed from photodetector state change element 30, thereby allowing light to impinge on photodetector state change element 30. As a result, sufficient power may be provided for purposes of registering a change of state in the memory cell to the state that indicates that mail piece 20 has been opened.

As will be appreciated by those of skill in the art, numerous alternatives may be utilized for state change element 30 without departing from the scope of the present invention. For example, conductors such as conductive bands could be provided around the height and width of envelope 35 which create a closed circuit when the envelope is closed and which may become an open circuit when envelope 35 is opened. RFID tag 25 would in this example monitor the circuit and effect a change in a memory cell when an open circuit condition is detected. As another example, first and second electrical contacts may be provided on opposite sides of envelope 35, which electrical contacts are separated by the contents 40 of mail piece 20.

When the contents 40 are removed, the two electrical contacts are able to come in contact with one another and close a circuit. As in the previous example, RFID tag 25 would in this example monitor the state of the circuit and would effect a change in the memory cell when the circuit is detected to be in a closed position. It should be noted that both of these alternative mechanisms would require some way to provide power to the circuits in question, such as a battery provided as part of an active RFID tag or a solar cell or the like. As still another example, a compressible sensor could be provided within envelope 35 that is in a first compressed condition when envelope 35 is closed and is able to go to a second uncompressed condition when envelope 35 is opened. RFID tag 25 would monitor this sensor and effect a change of state in the memory cell when the sensor is detected to have moved to the uncompressed condition. As still another alternative example, a tab, such as a plastic tab, may be connected to the flap of envelope 35 or the contents 40 wherein the tab is inserted between one of the terminals of a battery and a metal contact provided on envelope 35. The act of opening the flap of the envelope and/or removing the contents 40 of the mail piece 20 would remove the tab from between the battery terminal and the contact, thereby allowing the circuit to be closed and power to be transmitted. Again, RFID tag 25 could monitor the status of this circuit and effect a change in a memory cell when the closing of the circuit and supply of battery power is detected. In this example, and in the example where two contacts are provided on opposite sides of envelope 35, it is preferable to include some type of biasing element that forces the electrical contacts to come into contact with one another when the barrier provided in between is removed. With any of the examples or alternatives described herein or contemplated hereby for state change element 30, the important thing is that it be able to provide a detectable condition that indicates the fact that the mail piece 20 has been opened.

Returning to the description of system 10 in FIG. 1, when each mail piece 20 is prepared, certain identifying information is programmed into or stored in RFID tag 25 attached to mail piece 20. The identifying information preferably includes a unique code such as a serial number that uniquely identifies mail piece 20. The identifying information may further include information that identifies or indicates the mailer of mail piece 20, and information that identifies or indicates the intended recipient of mail piece 20. Alternatively, this information identifying the mailer and intended recipient could also be stored in a database and linked to the unique code or serial number. Each RFID tag 25 may also have time related information programmed or stored therein which indicates the date and/or time that the associated mail piece 20 was prepared and/or induced into the mail stream. This information can be used in combination with information relating to the time each mail piece 20 was opened by the recipient, which may be determined in the manner described below, to determine for each mail piece 20 an interval between the mailing and opening thereof. Alternatively, in an RFID tag 25 having a clock functionality, a timer could be started when the associated mail piece 20 was prepared and/or induced into the mail stream and stopped when each mail piece 20 was opened by the recipient, with the elapsed time representing the interval between mailing and opening. Such information can be useful to mailers in designing mail pieces and evaluating the effectiveness of designs.

As shown in FIG. 1, user location 15 also includes RFID reader 50. RFID reader 50 is programmed to periodically, such as once every hour, interrogate all RFID tags 25 attached to mail pieces 20 that are within the transmission range of RFID reader 50. In particular, each interrogation session begins with a first step in which RFID reader 50 sends out a first signal that requests each RFID tag 25 within range to identify itself. In response, each RFID tag 25 that is within range will return a signal that includes the information that has been stored in RFID tag 25, including, preferably, the unique code, the information relating to the mailer and the intended recipient, and, in one specific embodiment, the information relating to the date and/or time the mail piece 20 was mailed. According to one aspect of the present invention, the responses from the RFID tags 25 can be used to establish an approximate time that each particular mail piece 20 entered user location 15. Specifically, this time may be determined by RFID reader 50, which preferably includes a clock component, by recording the time at which the RFID tag 25 of each mail piece 20 first responds to an interrogation signal sent by RFID reader 50. In the next step in each interrogation session, RFID reader 50 sends out a second signal that requests each RFID tag 25 that is within range to return a signal indicating whether it has been opened. The signal that is returned by each RFID tag 25 will depend on the state of the memory cell associated therewith as established by state change element 30. Although two separate interrogation steps have been described, it will be appreciated that a single step rather than multiple steps may be used for gathering the same information. All of the information received by RFID reader 50 is preferably stored by RFID reader 50 in the memory that is associated therewith.

In addition, RFID reader 50 may also record the time at which each RFID tag 25 that is within range first responds with a signal that it has been opened. This information may be useful as an estimate of the time at which the associated mail piece 20 was opened. In one embodiment, the time of the first previously-opened state response may be used as the estimated time of opening. In another embodiment, the time when each mail piece 20 was opened may be bracketed to the frequency at which interrogation sessions occur, e.g., once an hour. For example, if during the first three interrogation sessions of a day the RFID tag 25 of a particular mail piece 20 responds with a signal indicating that it has not been opened, and during the fourth interrogation session it responds with a signal indicating that it has been opened, the time of opening can be bracketed to somewhere between the third and fourth interrogation sessions. As an alternative for determining the time that a particular mail piece has been opened, each RFID tag 25 may be provided with an internal clock that is used to record the time that state change element 30 changes state (i.e., the time that the associated mail piece 20 was opened). That time could then be transmitted to RFID reader 50 during an interrogation session along with the signal that indicates that the mail piece 20 has been opened. This alternative embodiment would require the RFID tags 25 to have some way of independently powering the internal clock, such as the battery that forms a part of active RFID tags. An additional feature of RFID tags 25 having independently powered internal clocks is that multiple changes of state could also be recorded, stored in memory, and transmitted to the RFID reader during the interrogation cycle. Thus, for example, the length of time that the mail piece remained opened may be ascertained by recording the time interval between two changes of state. Additionally, this embodiment could record multiple changes of state that would occur if the recipient, for example, opened the mail piece, considered the contents, then shortly thereafter re-inserted the contents back into the envelope, and then re-opened the envelope at a later time. Data on these time intervals may be of significant interest to the mailer in helping to determine the behavior patterns of the mail recipients.

In yet another embodiment, RFID reader 50 may be used to determine whether and, if so, when each mail piece 20 has been discarded, and whether it was opened prior to being discarded. Specifically, RFID reader 50 in this embodiment is provided with a transmission range approximately equal to the size of user location 15 and keeps track of each mail piece 20 that is within range of RFID reader 50 (and thus responds as described above during each interrogation session). When a mail piece 20 that was at one time within range and thus responded during one or more interrogation sessions no longer responds with a signal when interrogated, RFID reader 50, by implication, considers that mail piece 20 to have been discarded. The time at which a mail piece 20 no longer responds, i.e., the time of the first such interrogation session, may be used as an estimate of the time the mail piece 20 was discarded. In addition, the time the mail piece 20 was discarded may be compared to the time it first responded to an interrogation signal (i.e., the time it entered recipient location 15) to estimate the period of time the mail piece 20 remained at user location 15 before being discarded. RFID reader 50 in this embodiment will also store for each such mail piece 20 all of the other information collected during the interrogation sessions as described above, including the unique code for the mail piece 20, the mailer and intended recipient information for the mail piece 20, and whether and when the mail piece 20 was opened.

In yet another alternative embodiment, one or more additional RFID readers 50 could be placed in various locations such as in or near a trash can at recipient location 15, on trash collection trucks, or at a local trash dump. These additional RFID readers 50 would periodically interrogate all RFID tags 25 within range to determine and/or confirm whether one or more of mail pieces 20 have actually been discarded, and whether and when the mail pieces 20 were opened prior to being discarded.

Thus, as has been described, RFID reader 50 is able to collect and store a large amount of information relating to mail pieces 20 that are sent to and received at recipient location 15. This information would be of great value to mailers and/or other third parties, and therefore, according to a further aspect of the present invention, a mechanism is provided for further collecting such information from multiple RFID readers 50 located at multiple recipient locations 15 and distributing the information to interested parties. Referring again to FIG. 1, RFID reader 50 is provided with communications unit 55 for communicating information to remote data center 60 that includes a computer such as a PC or a server using communications link 65. Communications unit 55 may be any type of device capable of communicating information over communications link 65, such as a cell phone, a pager or a computer or cable modem, and may be integrated within or separate from but in communication with RFID reader 50. In addition, communications link 65 may take any of several known forms depending on the form of communications unit 55, such as a wireless link, a wired connection such as land phone lines or TV cables, a combination of both, or the Internet. Thus, the information collected by RFID reader 50 during the interrogation sessions may be communicated periodically, such as once a day, to data center 60. This information may include for each mail piece 20 one or more of the unique code for the mail piece 20, the information relating to the mailer and/or intended recipient, the date and/or time it was mailed, the date and/or time it enters the recipient location 15, whether and when it was opened, the interval between mailing and opening, the interval between entering recipient location 15 and opening, whether or when it was discarded, whether it was opened before being discarded, and how long it remained at the recipient location 15 prior to being discarded. Data center 60 may collect such information from numerous RFID readers 50 located at numerous recipient locations 15 and then consolidate/aggregate, manipulate, analyze and/or report (in various forms) the information to various parties such as the mailers that mailed one or more of mail pieces 20. As described above, such mailers may find this information particularly useful in designing mail pieces and/or evaluating mail piece designs.

In an alternate embodiment of the present invention, RFID reader 50 may be provided with functionality to enable the recipient to remove himself, herself, or itself from a mailing list associated with a particular mail piece 20. Specifically, RFID reader 50 may be provided with a button or the like that when depressed interrogates the RFID tag 25 of each mail piece 20 within range, and for each RFID tag 25 and mail piece 20 that responds, causes RFID reader 50 to create and store a request to remove the recipient from the mailing list associated with the mail piece 20. These requests would then be communicated to data center 60 along with the other information described above. The requests would ultimately be sent by data center 60 to the mailer or mailers in question. Alternatively, instead of creating and storing a removal request for all mail pieces 20 that happen to be within range of RFID reader 50, RFID reader 50 may first list all such responding mail pieces 20 on a display provided on RFID reader 50 and allow the recipient to select, such as with a keyboard or touch screen, the particular mail pieces 20 for which they would like to be removed from an associated mailing list. Requests as described above would then be created for only the selected mail pieces. As an alternative, instead of selecting from a display, each mail piece 20 could have a unique code, such as a four digit code, associated with it (for example, printed on envelope 35) that is entered in RFID reader 50 by the recipient to select particular ones of the responding mail pieces 20 for which removal requests are to be generated. As still another alternative, each mail piece 20 could be provided with a bar code and RFID reader 50 could be provided with a bar code scanner or reader. A recipient could then collect selected ones of mail pieces 20 for which they would like to be removed from associated mailing lists and use the bar code scanner or reader to read the bar codes of such mail pieces 20. RFID reader 20 would then create requests as describe above for each mail piece 20 that had its bar code read. As a further option, the button and other technologies just described may be used to communicate other messages to mailers in addition to a request to remove the recipient from a mailing list, such as a message to renew a subscription associated with a mail piece 20.

As an alternative to the embodiment of the present invention shown in FIG. 1 that utilizes RFID technology, technologies other than RFID technology may be used to communicate previously opened versus unopened states of mail pieces and other relevant information to an interrogator unit similar in functionality to RFID reader 50. For example, mail pieces 20 could be provided with a first piece of information on the outside of envelope 35 and a second piece of information on either the inside of envelope 35 or contents 40. The interrogator unit in this example would include a mechanism for reading and/or accepting entry of either the first piece of information (for unopened mail pieces 20) or the second piece of information (for opened mail pieces 20). In one embodiment, the first and second pieces of information may be bar codes, and the interrogator unit may include a bar code scanner. In another embodiment, the first and second pieces of information may be text, and the interrogator unit may include an OCR (optical character recognition) reader or a manual entry system such as a keypad for reading or entering the first piece of information (for unopened mail pieces 20) or the second piece of information (for opened mail pieces 20) into the interrogator unit. In any of these alternatives, the interrogator unit would further include a processor and a memory, and a communications unit similar to communications unit 55. As will be appreciated by those of skill in the art, each of these alternatives, unlike the embodiment shown in FIG. 1, requires active participation by the recipient.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A system for determining whether a mail piece has been opened, comprising:
- one or more mail pieces, each of said mail pieces including means for indicating a state of said mail piece, said state being one of a never opened state and a previously opened state;
- an interrogator unit for receiving first information relating to each of said mail pieces, said first information including said state of said mail piece; and
- a data center in communication with said interrogator unit, said data center receiving said first information from said interrogator unit, said indicating means being a state change element.

2. A system according to claim 1, said interrogator unit being an RFID reader, each of said mail pieces having an RFID tag attached thereto in electrical communication with said state change element, said RFID tag transmitting said first information to said RFID reader.

3. A system according to claim 2, said RFID tag further comprising a memory cell for registering said state of said mail piece.

4. A system according to claim 2, said state change element being a photodetector, each of said mail pieces further comprising an opaque piece for covering said photodetector when said mail piece is in said never opened state.

5. A system according to claim 4, wherein said opaque piece is removed from said photodetector when said mail piece is in said opened state.

6. A system according to claim 2, said RFID tag having second information stored therein, said second information including a unique code, said first information including said second information.

7. A system according to claim 6, said second information further including information relating to a mailer of said mail piece and information relating to an intended recipient of said mail piece.

8. A system according to claim 6, said second information for each of said mail pieces further including information relating to a date or time said mail piece was mailed.

9. A system according to claim 6, further comprising one or more second RFID readers located in or near one or more of a trash can, a trash truck and a trash dump, said second RFID readers receiving and storing said first information and creating third information indicating for each mail piece within a range thereof that said mail piece has been discarded.

10. A system according to claim 6, said RFID reader further comprising means for generating a removal request for each of one or more of said mail pieces, said removal request requesting that said recipient be removed from a mailing list associated with said mail piece, said removal request for said each of said one or more of said mail pieces being transmitted to said data center.

11. A system according to claim 6, said RFID reader further comprising means for generating a recipient action request for each of one or more of said mail pieces, said recipient action request requesting a desired action by said recipient relating to said mail piece.

12. A system according to claim 11, said desired action being a renewal or cancellation of a subscription.

13. A system according to claim 6, said unique code being associated with a mailer of said mail piece, further comprising a database, said database storing information for each said unique code relating to at least one of an intended recipient of said mail piece and a date or time said mail piece was mailed.

14. A system according to claim 2, said REID reader periodically transmitting one or more interrogation signals and receiving said first information in response to said one or more interrogation signals from those of said mail pieces located within a range of said RFID reader.

15. A system according to claim 14, said RFID reader recording for each mail piece that is previously opened a time of opening, said time of opening for each mail piece being determined based on a first time when said state forming a part of said first information is a previously opened state, said time of opening being transmitted to said data center.

16. A system according to claim 15, said REID reader further recording for each mail piece a time of receipt, said time of receipt for each mail piece being determined based on a first time when said first information for said mail piece is received by said REID reader, said REID reader determining an interval between said time of receipt and said time of opening, said interval being transmitted to said data center.

17. A system according to claim 14, said RFID reader recording for each mail piece a time of receipt, said time of receipt for each mail piece being determined based on a first time when said first information for said mail piece is received by said RFID reader.

18. A system according to claim 17, said time of receipt for each mail piece being transmitted to said data center.

19. A system according to claim 14, said REID reader recording for each mail piece deemed to be discarded a time of discarding, said time of discarding for each mail piece being determined based on a first time said first information is not received by said REID reader in response to said one or more interrogation signals after said first information has been previously received by said REID reader.

20. A system according to claim 19, said time of discarding for each mail piece being transmitted to said data center.

21. A system according to claim 19, said RFID reader further recording for each mail piece a time of receipt, said time for receipt for each mail piece being determined based on a first time when said first information for said mail piece is received by said RFID reader, said RFID reader determining an interval between said time of receipt and said time of discarding, said interval being transmitted to said data center.

22. A system according to claim 2, said RFID tag for each mail piece that is opened recording a time of opening, said time of opening being a first time said state changes from a never opened state to a previously opened state, said first information for each mail piece further comprising said time of opening.

23. A system according to claim 22, said REID reader further recording for each mail piece a time of receipt, said time of receipt for each mail piece being determined based on a first time when said first information for said mail piece is received by said REID reader, said RFID reader determining an interval between said time of receipt and said time of opening, said interval being transmitted to said data center.

24. A system according to claim 1, said first information including information relating to multiple changes of said state for said mail piece.

25. A system according to claim 1, further comprising one or more additional interrogator units, each of said additional interrogator units receiving additional first information relating to one or more mail pieces, said data center receiving said additional first information from each of said additional interrogator units and consolidating said first information and said additional first information.

26. A system according to claim 1, said indicating means comprising first and second pieces of information provided with said mail piece, said first piece of information indicating said never opened state and said second piece of information indicating said previously opened state, wherein for each of one or more of said mail pieces a recipient communicates one of said first piece of information and said second piece of information to said interrogator unit.

27. A system according to claim 26, wherein said first piece of information and said second piece of information each comprise a bar code, said interrogator unit further comprising a bar code scanner.

28. A system according to claim 26, wherein said first piece of information and said second piece of information each comprise text, said interrogator unit further comprising at least one of an OCR reader and a manual entry system.

29. A method for determining whether a mail piece has been opened, comprising:

receiving one or more mail pieces at a recipient location;

receiving at an interrogator unit at said recipient location first information from each of one or more of said mail pieces, said first information for each of said mail pieces including a state of said mail piece, said state being one of a never opened state and a previously opened state; and transmitting said first information from said interrogator unit to a data center, wherein each of said mail pieces includes a state change element for indicating said state of said mail piece.

30. A method according to claim 29, wherein each of said mail pieces includes means for indicating said state of said mail piece.

31. A method according to claim 29, said interrogator unit being an RFID reader, each of said mail pieces having an REID tag attached thereto in communication with said state change element, said method further comprising using said RFID tags to transmit said first information for each of said one or more of said mail pieces to said REID reader.

32. A method according to claim 31, further comprising registering said state of each of said mail pieces in a memory cell.

33. A method according to claim 31, said state change element being a photodetector, each of said mail pieces further comprising an opaque piece for covering said photodetector when said mail piece is in said never opened state, said method further comprising changing said state of each mail piece to said previously opened state when said opaque piece is removed from said photodetector.

34. A method according to claim 31, said RFID tag having second information relating to said mail piece stored therein, said second information including at least one of a unique code, information relating to a mailer of said mail piece and information relating to an intended recipient of said mail piece, said first information including said second information.

35. A method according to claim 34, said second information for each of said mail pieces further including information relating to a date or time said mail piece was mailed.

36. A method according to claim 34, further comprising receiving and storing said first information in one or more second REID readers located in or near one or more of a trash can, a trash truck and a trash dump and creating third information indicating for each mail piece within a range said one or more second RFID readers that said mail piece has been discarded.

37. A method according to claim 34, further comprising generating a removal request for each of one or more of said mail pieces using said RFID reader, said removal request requesting that said recipient be removed from a mailing list associated with said mail piece, and transmitting said removal request for said each of said one or more of said mail pieces to said data center.

38. A method according to claim 34, further comprising generating a recipient action request for each of one or more of said mail pieces, said recipient action request requesting a desired action by said recipient relating to said mail piece.

39. A method according to claim 38, said desired action being a renewal or cancellation of a subscription.

40. A method according to claim 34, said unique code being associated with a mailer of said mail piece, said method further comprising storing in a database information for each said unique code relating to at least one of an intended recipient of said mall piece and a date or time said mail piece was mailed.

41. A method according to claim 31, further comprising periodically transmitting one or more interrogation signals from said RFID reader, said step of receiving said first information comprising receiving said first information from those of said mail pieces located within a range of said RFID reader in response to said one or more interrogation signals.

42. A method according to claim 41, further comprising recording in said RFID reader a time of opening for each mail piece that is opened, said time of opening for each mail piece being determined based on a first time when said state forming a part of said first information is a previously opened state, and transmitting said time of opening to said data center.

43. A method according to claim 42, further comprising recording in said RFID reader a time of receipt for each mail piece, said time of receipt for each mail piece being determined based on a first time when said first information for said mail piece is received by said RFID reader, determining at said RFID reader an interval between said time of receipt and said time of opening, and transmitting said interval to said data center.

44. A method according to claim 41, further comprising recording in said RFID reader a time of receipt for each mail piece, said time of receipt for each mail piece being determined based on a first time when said first information for said mail piece is received by said RFID reader.

45. A method according to claim 44, further comprising transmitting said time of receipt for each mail piece to said data center.

46. A method according to claim 36, further comprising recording in said RFID reader a time of discarding for each mail piece deemed to be discarded, said time of discarding for each mail piece being determined based on a first time said first information is not received by said RFID reader in response to said one or more interrogation signals after said first information has been previously received by said RFID reader.

47. A method according to claim 46, further comprising transmitting said time of discarding for each mail piece to said data center.

48. A method according to claim 46, further comprising recording in said RFID reader a time of receipt for each mail piece, said time of receipt for each mail piece being determined based on a first time when said first information for said mail piece is received by said RFID reader, determining at said RFID reader an interval between said time of receipt and said time of discarding, and transmitting said interval to said data center.

49. A method according to claim 31, further comprising recording in said RFID tag a time of opening for each mail piece that is opened, said time of opening being a first time said state changes from a never opened state to a previously opened state, said first information for each mail piece further comprising said time of opening.

50. A method according to claim 49, further comprising recording in said RFID reader a time of receipt for each mail piece, said time of receipt for each mail piece being determined based on a first time when said first information for said mail piece is received by said RFID reader, determining at said REID reader an interval between said time of receipt and said time of opening, and transmitting said interval to said data center.

51. A method according to claim 29, said first information including information relating to multiple changes of state for said mail piece.

52. A method according to claim 29, further comprising receiving at said data center additional first information relating to one or more mail pieces from one or more additional interrogator units and consolidating said first information and said additional first information.

53. A method according to claim 29, wherein in said receiving step, a recipient of said one or more mail pieces communicates said first information to said interrogator unit.

54. A method according to claim 53, wherein said recipient communicates said first information by scanning a bar code.

55. A method according to claim 53, wherein said recipient communicates said first information by scanning or manually entering text.

* * * * *